Dec. 9, 1969     A. TRASK     3,482,415

EXPANSION VALVE FOR HEAT PUMP

Filed March 1, 1968

INVENTOR:
ALLEN TRASK

BY M. R. Marsh
ATTORNEY.

United States Patent Office 3,482,415
Patented Dec. 9, 1969

3,482,415
EXPANSION VALVE FOR HEAT PUMP
Allen Trask, 288 Genesee St.,
Utica, N.Y. 13502
Filed Mar. 1, 1968, Ser. No. 709,556
Int. Cl. F25b *13/00, 41/04;* F16k *15/06*
U.S. Cl. 62—222                                    10 Claims

ABSTRACT OF THE DISCLOSURE

An expansion valve for controlling refrigerant flow into the outdoor heat exchanger of an air-to-air heat pump during heating cycles constructed to maintain a predetermined pressure differential between the condensing pressure in the indoor heat exchanger and the evaporating pressure in the outdoor heat exchanger.

---

This invention relates to refrigerant expansion valves for heat pumps and particularly to a novel expansion valve for regulating the refrigerant flow to the outdoor heat exchanger coil of air-to-air heat pumps during heating cycles.

One described embodiment of the expansion valve of this invention is constructed to maintain a selected fixed differential pressure difference between the evaporating pressure in the outdoor coil and the condensing pressures in the indoor coil during heating cycles. The construction of the expansion valve is similar to that of a fluid pressure relief safety valve wherein the valve closing member is held on its seat by a compression spring tension adequate for maintaining the valve closed until a selected fluid pressure raises the valve closing member from its seat thereby permitting fluid flow through the expansion valve.

In heat pumps using this expansion valve the selected pressure differential added to the evaporating pressure in the outdoor coil determines the condensing pressure in the indoor heat exchanger coil during heating cycles. The pressure differential is maintained through the full range of evaporating pressures. In a heat pump using refrigerant 22 the evaporating pressures may extend from 20 pounds in zero weather, to 70 pounds in mild weather. It is possible to sustain a fixed pressure differential because the optimum refrigerant charge amount for heating cycles in average winter temperatures is substantially less than the optimum charge for cooling cycles. The amounts of the surplus refrigerant are in inverse proportion to the outdoor air temperatures. As the temperatures fall the amount of the surplus refrigerant in the system increases.

The differential expansion valve of this invention holds back the surplus refrigerant charge in the indoor coil until its accumulation causes the effective coil condensing surface reduction required to raise the condensing pressure high enough to open the expansion valve as required to maintain the selected pressure differential. While less refrigerant is evaporated in the outdoor coil at colder temperatures, a proportionately reduced amount of liquid refrigerant will be released to it by the differential expansion valve, and the surplus refrigerant will remain as a liquid in the indoor coil to build up and maintain its condensing pressures, and corresponding heating temperatures, substantially higher than in conventional heat pumps under the same conditions.

The higher condensing temperatures achieved through the functioning of the differential expansion valves of this invention in the heating cycles of air-to-air heat pumps produce more heat gain and higher coefficients of performance than can be attained by the use of conventional expansion devices for metering refrigerant to the outdoor coils.

The chart following lists the evaporating pressures and the condensing pressures of a conventional heat pump at various outdoor temperatures using a conventional thermostatic expansion valve for the outdoor coil. Also there is listed the condensing pressures and temperatures produced in the same heat pump when the thermostatic expansion valve has been replaced by a differential expansion valve of this invention having a differential pressure setting of 225 pounds, and operating under the same test conditions. The additional heat gain achieved by the use of the differential expansion valve is listed in the right hand data column.

| Conventional Heat Pump | | Heat Gain Data | | Heat Pump With Differential X-Valve, 225 Lb. Differential | | |
|---|---|---|---|---|---|---|
| Head Pressure, lbs. | Condensing Temp., Degrees | Outdoor Temp., Degrees | Evap. Pressure, lbs. | Head Pressure, lbs. | Condensing Temp., Degrees | Temp. Gain Degrees |
| 297 | 129 | 70 | 72 | 297 | 129 | -------- |
| 285 | 126 | 65 | 67 | 292 | 128 | 2 |
| 273 | 123 | 60 | 62 | 287 | 127 | 4 |
| 261 | 120 | 55 | 57 | 282 | 126 | 6 |
| 249 | 116 | 50 | 53 | 278 | 124 | 8 |
| 237 | 113 | 45 | 48 | 273 | 123 | 10 |
| 225 | 109 | 40 | 44 | 269 | 122 | 13 |
| 214 | 105 | 35 | 40 | 265 | 121 | 16 |
| 204 | 102 | 30 | 36 | 261 | 120 | 18 |
| 195 | 99 | 25 | 33 | 258 | 119 | 20 |
| 186 | 96 | 20 | 30 | 255 | 118 | 22 |
| 177 | 93 | 15 | 27 | 252 | 117 | 24 |
| 168 | 89 | 10 | 24 | 249 | 116 | 27 |
| 160 | 86 | 5 | 21 | 246 | 115 | 29 |
| 153 | 83 | Zero | 18 | 243 | 114 | 31 |

In both heat pump tests reported on the Heat Gain Data Chart the condensing pressure is the same at the outdoor temperature of 70 degrees when the evaporating pressure of 70 pounds is common to both the cooling cycle and the heating cycle wherein the full refrigerant charge is in active circulation using the full surface areas of both the indoor and the outdoor coils. As the outdoor temperatures get colder less refrigerant is evaporated. The surplus refrigerant is then retained in the indoor coil to reduce its effective condensing surface and thereby produce higher condensing pressures, and higher resulting temperatures, than those of conventional heat pumps when a differential expansion valve of this invention is used.

The surplus liquid refrigerant in heating cycles of conventional heat pumps is permitted by conventional expansion devices to leave the indoor coil immediately after condensation without significant accumulation therein, whereupon it flows into the outdoor coil at a rate faster than it can be evaporated therein. The surplus liquid refrigerant then flows through the outdoor coil to return to the compressor crankcase where it mixes with the compressor lubricating oil causing excessive and compressor damaging oil dilution under normal heat pump operating conditions.

Under certain normal heat pump operating conditions the large volume of liquid refrigerant mixed with the compressor lubricating oil vaporizes to cause effervescent oil foam which is pumped out of the crankcase by compressor operation in such volume that the crankcase oil level is sometimes reduced below the point where the oil pump can pick it up for delivery to the compressor bearings. This lubrication failure is reported by compressor manufacturers to often be the cause of stuck compressors that require replacement under compressor warranties.

Heat pump compressor damage from liquid refrigerant flood-back to the crankcase has been so extensive in the industry that the manufacturers of compressors used in heat pumps are currently requiring heat pump maufacturers to install as standard equipment suction line accumulators to intercept surplus liquid refrigerant flood-back from the outdoor coil as a prerequisite to their honoring their warranties on compressors that have failed in heat pump operation. The additional purchasing cost of a suction line accumulator and its installation cost is not welcomed by heat pump manufacturers. The use of a differential expansion valve of this invention eliminates the requirement for an accumulator in heat pumps, and it protects the compressor from the problems and damage caused by liquid refrigerant flood-back to its crankcase.

In view of the above, the primary objects of the present invention include the following:

The elimination of compressor damage from liquid refrigerant flood-back to the compressor crankcase during heating cycles.

The elimination of the necessity for and the expense of a suction line accumulator.

To provide a refrigerant expansion device for metering refrigerant to the outdoor coil costing less than a conventional thermostatic expansion valve.

To provide a refrigerant expansion device simpler mechanically, and more dependable in operation than conventional expansion valves.

To obtain heat gain in heating cycles increasing in inverse proportion to outdoor air temperatures.

To provide a higher coefficient of heating performance than attained by the conventional refrigerant expansion devices.

To provide a pressure limiting safety valve protecting the compressor during heating cycles from head pressures in excess of normal operating pressures, and To provide a hot gas bypass valve to prevent a compressor overload in mild weather heating cycles which eliminates the need for a mild weather switch.

The above and other objects of my invention will be more apparent from the following detailed description of the preferred and on modification embodiment thereof wherein reference is made to the accompanying drawings forming a part hereof.

Figure 1:
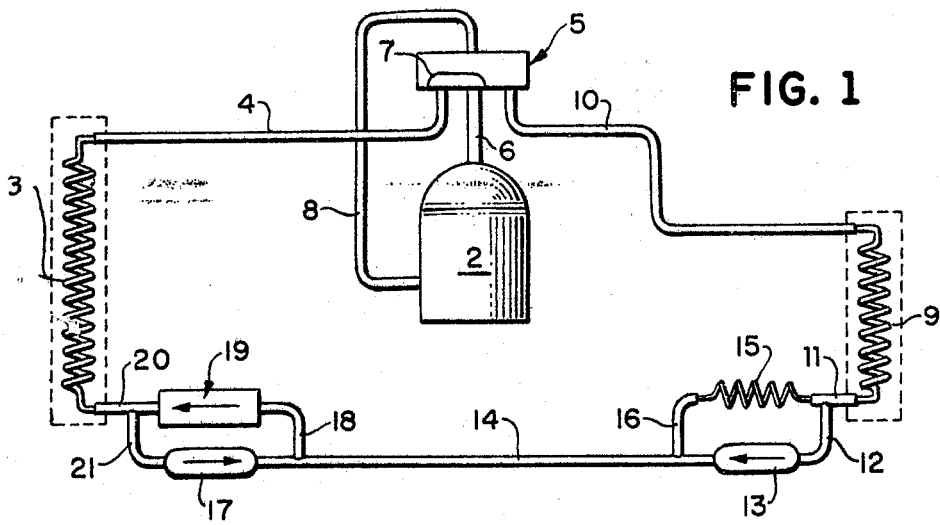
FIG. 1 is a refrigerant circuit diagram of an air-to-air heat pump system arranged for operation in a heating cycle and showing a differential expansion valve of this invention assembled into the refrigerant circuit.

Referring now to FIG. 1 of the drawings, a compressor 2 is drawing refrigerant vapor from outdoor heat exchanger coil 3, through conduit 4, reversing valve 5, and conduit 6. The D slide valve 7 in reversing valve 5 is shown in its position for heating cycles, the compressed refrigerant vapor is discharged from compressor 2, through conduit 8 to reversing valve 5, through which it flows to the indoor heat exchanger coil 9 through conduit 10.

In the heating cycle diagram of FIG. 1, the indoor coil 9 functions as a condenser coil wherein the compressed refrigerant vapor gives up its heat to the indoor air and converts into liquid which leaves indoor coil 9 under the refrigerant condensing pressure to flow through conduit 11, conduit 12, and check valve 13 into conduit 14. A small amount of the condensed liquid refrigerant flows from conduit 11, through capillary tube 15, and conduit 16 to join the refrigerant flow in conduit 14.

In cooling cycles the refrigerant flow is in the opposite direction through conduit 14 into conduit 16 and capillary tube 15 which reduces the refrigerant pressure and discharges the refrigerant into coil 9 through conduit 11. In cooling cycles check valve 13 closes to require the full refrigerant flow to coil 9 through capillary tube 15.

Returning now to the description of a heating cycle, the liquid refrigerant in conduit 14 under condensing pressure is blocked by check valve 17 which is in its closed position in heating cycles, but flows through conduit 18 to differential expansion valve 19. The expansion valve 19 is constructed to release liquid refrigerant at a predetermined set pressure into the outdoor coil 3 through conduit 20. In heating cycles coil 3 functions as an evaporator coil wherein the refrigerant absorbs heat from the outdoor air and is converted thereby into a vapor which leaves coil 3 through conduit 4 to complete one heating circuit and start another one.

In cooling cycles the refrigerant flows in the opposite direction out of coil 3, through conduits 20, 21, and check valve 17 into conduit 14, and thence through conduit 16, capillary tube 15, and conduit 11 to coil 9, as described above. During cooling cycles the differential expansion valve 19 remains closed under its differential pressure setting.

Figure 2:
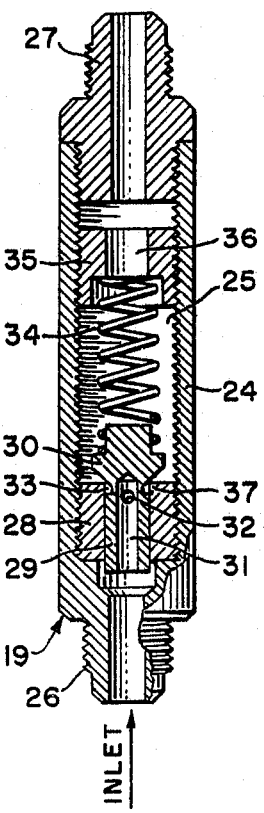
FIG. 2 is a cross section assembly drawing of a preferred construction of the differential expansion valve of FIG. 1.

Referring to FIG. 2, the differential expansion valve 19 construction is shown having an elongated body 24 defining an internal chamber 25 in communication with a flare type inlet tube fitting 26 at its left end, and at its right hand end an outlet flare tube fitting 27 attached thereto with a threaded connection. A valve seat member 28 has an axial center hole with valve seat 37 at its right hand end, and is secured inside the left end of valve body 25 with screw threads. A cylindrical valve closing piston 29 has a free sliding fit within the axial hole in valve seat member 28, and a mushroom head 30 arranged to seat upon annular valve seat 37 at the right hand end of valve seat member 28. The effective area of valve piston 29 and valve seat 37 under inlet pressure, are substantially equal. The valve piston 29 has an axial bore 31 in communication with its cross-hole 32 at one end and inlet flare fitting 26 at the other end. An annular groove 33 in communication with piston cross-hole 32 is at the base of the valve piston head 30, and is arranged to establish communication between valve piston bore 31 and the interior of valve body 25 when piston head 30 is raised from its valve seat 37. Cross-hole 32 is sized to throttle refrigerant flow through the expansion valve for determining valve capacity, and for reducing its flow velocity and erosion effect in passing valve seat 37 and valve piston mushroom 30, when the valve is open.

A compression coil spring 34 having helical separated coils has its left end in pressure contact with palve mushroom 30, and its right end against spring retainer 35 which is assembled into the valve body chamber 25 with an adjustable screw thread fit for adjusting and setting the compression pressure with which spring 34 holds the valve mushroom 30 on its seat. Spring retainer 35 has a central hole 36 axially therethrough providing communication between flare fitting 27 and the internal valve chamber 25. Thus when the valve mushroom 30 is raised from its seat 37 there is open communication from inlet flare fitting 26, through valve piston hole 31, piston cross-hole 32, annular piston groove 33, the separated coils of spring 34, and the hole 36 in spring retainer 35, to the outlet flare fitting 27.

In operation the expansion valve of FIG. 2 in a heating cycle controls the flow of liquid refrigerant from indoor coil 9 to outdoor coil 3, by the raising of valve mushroom 30 above its seat 37 when the inlet refrigerant condensing pressure against the effective area of valve piston 37 is adequate to raise valve mushroom 30 above its seat 37 against the combined pressures of compression spring 34 and the evaporating pressure within outdoor coil 3 which is effective in urging valve mushroom 30 to a closed position on valve seat 37.

In air-to-air heat pumps the indoor coil is smaller than the outdoor coil usually with a ratio between 1 to 2, or 2 to 3. The adaptation of a differential expansion valve of this invention to an air-to-air heat pump system requires for optimum functioning the correct integration of two variables; one, a selected ratio between the internal volume of the coils whereby the surplus refrigerant volume retained in the indoor coil at various temperatures of outdoor air will reduce the effective coil condensing surface as required to maintain the condensing temperatures determined by the set differential pressure of the expansion valve, plus the evaporating pressure in the outdoor coil, substantially as shown on the heat gain chart herein; and two, the amount of the differential pressure as determined by the refrigerant evaporation rate in the outdoor coil. The differential pressure should be set to release liquid refrigerant as fast as it is evaporated, with provision for a few degrees of suction vapor superheat at the outdoor coil outlet tube. The evaporation rate and the corresponding throttling of the expansion valve may be checked through a selected range of outdoor temperatures by a recording thermometer sensing the temperature at the outlet tube of the outdoor coil, and a recording pressure gage sensing the evaporating pressures within the outdoor coil, to check the presence and amount of suction line superheat. The differential pressure setting of the expansion valve may then be adjusted to the selected indoor coil volume for maintaining a suction line superheat from the outdoor coil in the range of 5 to 10 degrees.

When a differential expansion valve of this invention is adapted to an air-to-air heat pump as explained herein, liquid refrigerant flood-back to the compressor in heating cycles will be eliminated by the retension of the surplus refrigerant within the indoor coil so that a suction line accumulator will not be required. There will be a higher heat gain in heating cycles substantially as shown in the Heat Gain Chart herein, and a resulting higher coefficient of performance than can be attained through the use of a conventional expansion device for the outdoor coil. When the differential expansion valve of FIG. 2 is used, the pressure setting of the valve spring, plus the evaporator pressure, determines the maximum condensing pressure possible in heating cycles for each corresponding outdoor air temperature. Thus this differential expansion valve is inherently a pressure limiting safety valve in heating cycles.

When heating cycles are called for during outdoor temperatures above 70 degrees, the differential expansion valve of this invention will function as a hot gas bypass valve to limit both the evaporating pressure rise, and the condensing temperature rise above a normal operating range within the capacity of the compressor. The need for a mild weather switch to reduce or stop the air flow through the outdoor coil for the purpose of preventing excessive evaporating and condensing pressures in mild weather is eliminated.

Figure 3:
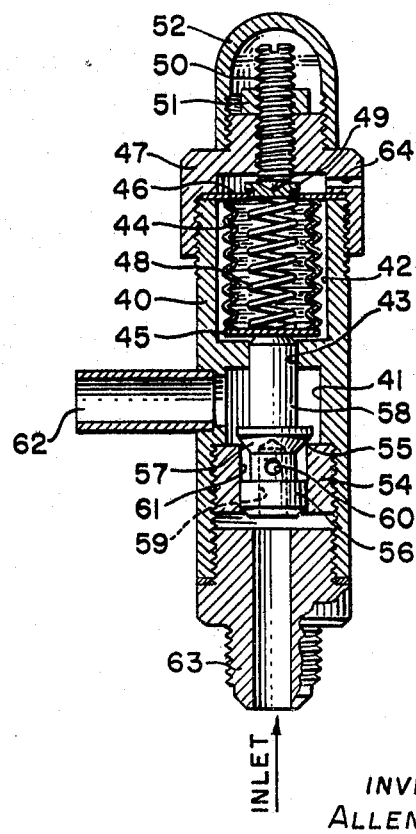
FIG. 3 is a cross section assembly drawing of a modification of the differential expansion valve of the present invention and providing for external adjustment of its differential pressure setting.

A modification of the differential expansion valve is shown in FIG. 3 and includes external means for the adjustment of its pressure setting. It is constructed with its valve body 40 defining an internal valve chamber 41, and a bellows chamber 42, with a partition 43 separating the two chambers. A metal bellows 44 disposed in bellows chamber 42 has an end closure 45 adjacent and spaced from partition 43, and has an annular flange 46 attached at its upper end where it extends over the end of valve body 40. A valve body cap 47 is attached to the bellows end of body 40 with screw threads and is arranged to clamp annular flange 46 to the end of valve body 40 with a vapor pressure tight fit.

A compression spring 48 disposed within bellows 44 has one end pressing against bellows end closure 45, and its other end against adjusting screw washer 49 at the end of adjusting screw 50 axially disposed through body cap 47 and its locknut 51, for adjusting and maintaining compression pressure on bellows closure 45 through compression spring 48. A protective dust cap 52 is provided for enclosing the external end of adjusting screw 50. The interior of bellows 44 is in communication with atmospheric pressure through air hole 64 in body cap 47.

Valve chamber 41 having partition 43 at one end is closed at the other end with flare fitting 63 attached to valve body 40 with screw threads. Annular valve seat member 54 has a valve seat 55 at one end and is secured within chamber 41 with screw threads. A piston valve 56 adapted to slide within an axial hole in valve seat member 54, has an annular, integral, concentric flange 57 adapted to close valve seat 55, and an extended cylindrical, concentric shank extending in a free fit through partition 43 to contact bellows closure 45. The diameter and effective area of piston 56 and valve seat 55 are approximately equal. The compression pressure of spring 48 is transferred to the valve mushroom 57 through the valve shank 58 whereby valve mushroom 57 is held on valve seat 55 by the compression pressure of spring 48.

Valve piston 56 has an axial hole 59 in communication with cross-hole 60 therethrough which opens into annular groove 61 around valve piston 56 at the base of its mushroom 57. Cross-hole 60 is sized to throttle refrigerant flow through the valve, for determining flow capacity of the valve, and for reducing fluid flow velocity and pressure at the valve seat when the valve is open. Since the effective area of valve piston 56 and its seat 55 are approximately the same, the lift of mushroom 57 is determined by the cross section area of piston 56 when the fluid pressure under mushroom 57 is less than the fluid pressure against piston 56. In this respect the structure and functioning of the differential expansion valves of FIG. 2, and FIG. 3 are similar. An outlet tube 62 is in communication with valve chamber 41.

The expansion valve of FIG. 3 may be used as an alternate for the differential expansion valve of FIG. 2 shown in the heat pump system diagram of FIG. 1 as expansion valve 19.

In operation the expansion valve of FIG. 3 in a heating cycle controls the flow of liquid refrigerant from indoor coil 9 to outdoor coil 3, by the raising of valve mushroom 57 above its seat 55 when the inlet refrigerant pressure against the effective area of valve piston 56 overcomes the compression pressure of spring 48 plus the atmospheric pressure within the bellows. The effective area of bellows 44 is approximately equal to the open area of valve seat 55 and piston 56 so that the pressure in valve body chamber 41 is neutralized in its force against the bellows end closure 45 and the valve piston 56. Valve mushroom 57 is then held on its seat 55 by the sum of the pressure of spring 48 and atmospheric pressure.

When the inlet pressure through flare fitting 63 raises mushroom 57 from its seat 55 open communication is established through valve piston hole 59, cross-hole 60, and annular groove 61 to valve body chamber 41, and thence to outlet tube 62. The functioning of this expansion valve maintains a substantially constant condensing pressure in indoor coil 9. Its functioning provides a differential pressure between the condensing pressure of indoor coil 9, and the evaporating pressure in outdoor coil 3.

While this invention has been shown with but two embodiments of a differential expansion valve, and their functioning in an air-to-air heat pump circuit explained, it will be obvious that variations and modifications may be made therein without departing from the spirit or essential attributes thereof, and it is desired therefore that only such limitations be placed thereon as are specifically set forth in the appended claims.

What is claimed is:

1. An air-to-air heat pump system comprising an indoor heat exchanger, an outdoor heat exchanger having an internal volume substantially larger than the internal volume of said indoor heat exchanger, a compressor, a reversing valve, an indoor exchanger expansion device, an outdoor exchanger expansion device, a charge of refrigerant in the optimum amount for cooling cycles, a check valve connected in parallel with said indoor expansion device to be open during heating cycles and closed during cooling cycles, and a check valve connected in parallel with said outdoor expansion device to be open during cooling cycles and closed during heating cycles to require liquid refrigerant to be metered by said outdoor expansion device to said outdoor exchanger functioning as an evaporator, said outdoor expansion device including refrigerant pressure and flow regulating means for maintaining a substantially constant refrigerant pressure differential between the low pressure in said outdoor exchanger and the relatively high pressure in said indoor exchanger during heating cycles.

2. A heat pump system as claimed in claim 1, in which said outdoor expansion device includes a valve seat, a valve, and a compression spring arranged to resist the lift of said valve from its said seat by a selected differential pressure, varying a small percentage proportional to the compression rate of said spring, as said valve is regulated above its said seat by refrigerant pressure and flow at flow rates of varying amplitude directly proportional to outdoor temperatures.

3. A heat pump system as claimed in claim 1, and including means for adjusting the differential pressure setting of said outdoor expansion device to release refrigerant from said indoor exchanger at mass flow rates effecting refrigerant superheat at the suction inlet of said compressor.

4. A heat pump system as claimed in claim 1, and including means whereby said outdoor expansion device has its differential pressure setting adjustable to limit the mass flow rate of liquid refrigerant entering the suction inlet of said compressor to a relatively small flow rate harmless to the functioning of said compressor.

5. A heat pump system as claimed in claim 1, including means whereby said differential pressure setting of said outdoor expansion device is determined and set as the pressure required to immediately release refrigerant from said indoor exchanger upon its condensation therein, when the evaporating pressure in said outdoor exchanger approximates the evaporating pressure within said indoor exchanger during average cooling cycles.

6. A heat pump system as claimed in claim 1, including means whereby said refrigerant mass flow during heating cycles, when less than the mass flow during average cooling cycles, will have the surplus refrigerant in excess of the heating cycle mass flow retained within said indoor exchanger as liquid by the refrigerant flow restriction of said outdoor expansion device, thereby reducing the effective condensing surface of said indoor exchanger and proportionately controlling its condensing pressure to the amount required to cause said outdoor expansion device to release refrigerant from said indoor exchanger at mass flow rates, substantially equalling the instant evaporating rate of said outdoor exchanger.

7. A heat pump system as claimed in claim 1, in which said indoor exchanger has its internal volume ratio to the larger internal volume of said outdoor exchanger balanced with a selected differential pressure setting for said outdoor expansion device to cause said outdoor expansion device to effect refrigerant vapor condensing within, and liquid refrigerant release immediately from, said indoor heat exchanger substantially at the refrigerant mass of flow rates occurring when the evaporating pressure in said outdoor exchanger approximates an average evaporating pressure within said indoor exchanger during cooling cycles.

8. A heat pump system as claimed in claim 1, wherein the ratio of the internal volume of said indoor exchanger to the larger internal volume of said outdoor exchanger, is balanced with the selected differential pressure for said outdoor expansion device to cause said outdoor expansion device to effect during cold weather retention of surplus liquid refrigerant within said indoor exchanger in amounts inversely proportional to outdoor air temperatures, while releasing therefrom refrigerant at mass flow rates approximating the instant evaporating capacity of said outdoor exchanger.

9. A heat pump system as claimed in claim 1, in which said indoor heat exchanger has its internal volume ratio to the larger internal volume of said outdoor exchanger determined as the ratio, whereby surplus liquid refrigerant condensed during heating cycles in cold weather will be retained within said indoor exchanger by said outdoor expansion device in amounts, inversely proportional to outdoor air temperatures, regulating the pressures within said indoor exchanger to cause said outdoor expansion device to release refrigerant at mass flow rates approximating the instant evaporating rate of said outdoor exchanger.

10. A heat pump system as claimed in claim 1, in which the condensing pressure within said indoor heat exchanger during heating cycles is maintained by said outdoor expansion device to be a predetermined amount of pressure, higher than the evaporating pressure within said outdoor heat exchanger.

References Cited

UNITED STATES PATENTS

| | | | |
|---|---|---|---|
| 1,891,357 | 12/1932 | Peltier | 62—222 |
| 1,985,134 | 12/1934 | Yount | 62—222 |
| 2,056,482 | 10/1936 | Philipp | 62—222 |
| 2,206,356 | 7/1940 | Hutchings | 137—538 |
| 2,287,840 | 6/1942 | Stratton | 137—538 |
| 2,785,540 | 3/1957 | Biehn | 62—324 |
| 2,928,417 | 3/1960 | Buckner | 137—538 |
| 3,066,497 | 12/1962 | Dubberley | 62—324 |
| 3,150,501 | 9/1964 | Moore | 62—324 |
| 3,274,793 | 9/1966 | Anderson | 62—324 |

WILLIAM J. WYE, Primary Examiner

U.S. Cl. X.R.

62—196, 324; 137—538, 625.3; 251—120, 121